Dec. 18, 1951 R. A. CARLETON 2,578,670
METHOD OF DEODORIZING AND STABILIZING SOYBEAN OIL
Filed Aug. 12, 1946 3 Sheets-Sheet 1

INVENTOR
Robert A. Carleton
BY
ATTORNEY

Dec. 18, 1951   R. A. CARLETON   2,578,670
METHOD OF DEODORIZING AND STABILIZING SOYBEAN OIL
Filed Aug. 12, 1946   3 Sheets-Sheet 2

INVENTOR
Robert A. Carleton
BY
ATTORNEY

Patented Dec. 18, 1951

2,578,670

UNITED STATES PATENT OFFICE 2,578,670

METHOD OF DEODORIZING AND STABILIZING SOYBEAN OIL

Robert A. Carleton, Mamaroneck, N. Y.

Application August 12, 1946, Serial No. 689,926

4 Claims. (Cl. 260—406)

The present invention relates to method for purifying and deodorizing oils and fats derived from vegetable, animal and marine sources.

It is among the objects of the present invention to provide a simple and economical method of deodorizing and stabilizing such vegetable, animal and marine oils containing or contaminated by unsaturated components having objectionable taste and odors, to produce a relatively stable, non-revertible, odorless and bland tasting product.

It has now been found that by blowing the oils with air in the presence of water, usually present in amount varying from 20% to 60% by weight of the oil, at temperatures between 110° F. to 225° F. for about 10 to 15 minutes, the malodorous and unpleasant tasting compounds present in natural oils and fats of vegetable, animal and marine type, together with the relatively highly unsaturated glycerides with which they are associated, may be very completely saturated by preferential or selective hydroxylation. This will result in the substantial elimination of the objectionable taste and odors present.

It has further been found that hydroxyl groups may be selectively added to the more unsaturated compounds present, such as those containing two or more double carbon bonds, with resultant modification of the compounds responsible for the objectionable taste and odors present. This is done without substantial hydroxyl group addition to the less unsaturated compounds present, for instance, those containing but one or two such double bonds, as in linoleic and oleic acid glycerides.

It has further been found that the hydroxyl groups so added to the oil compound are relatively stable, nor are they appreciably affected when exposed to relatively high temperature, light, oxidation, moisture and the many other factors that cause reversion or the development of undesirable taste and odors when such oils are deodorized by other or prior art methods.

The unpleasant taste and odor present in vegetable, animal and marine oils and fats and their tendency to revert or to develop undesirable taste and odor after deodorization usually increases in amount and intensity and to a major extent parallels the increase in or degree of unsaturation of such material.

For instance, many oils and fats, whose unsaturated components consist principally of linoleic and oleic acid glycerides, with substantially no linolenic acid glyceride content and having an iodine value below about 110, have a relatively mild taste. After moderate deodorization, they do not readily develop rancidity upon exposure to normal heat, light or atmospheric oxidation. On the other hand, oils having a moderate content of linolenic acid glycerides and an iodine value of about 110 to 140, require a more intensive treatment to effect deodorization and are substantially more susceptible to reversion or the development of objectionable taste and odors after such deodorization.

This is exemplified by the relative stability of peanut oil, which contains a relatively large linoleic, but substantially no linolenic acid glyceride content. Peanut oil is easily deodorized to a relatively stable product and does not readily develop reversion or rancidity as compared with more unsaturated oils. For example oils of the soya bean type having a greater content of linolenic acid glyceride are not only more difficult to deodorize, but also have a strong tendency to oxidation and the rapid development of objectionable taste and odors.

Another group of oils, having a still greater degree of unsaturation, with iodine value in excess of 140 and having an extremely unpleasant taste and odor, oils of the linseed type and certain fish and marine animal oils being typical examples, with components having carbon chains with up to 24 or more carbon atoms and up to 5 or more double carbon bonds, are deodorized with great difficulty. After such deodorization, these oils are subject to rapid reversion or the development of unpleasant taste and odors, which unfit them for edible and many other important uses.

Many other oils and fats of a highly saturated nature may have relatively poor stability or keeping qualities. For instance, lard and many similar compounds having an iodine value of less than 60 are subject to relatively rapid development of rancidity or objectionable taste and odors. This is probably due to the presence in the material of very small quantities or traces of arachidonic and other highly unsaturated fatty acid compounds having iodine value in excess of 300. These latter substances render the otherwise stable fat subject to rapid oxidative changes when exposed to atmospheric air. A relatively mild selective hydroxylation by the method of the present invention acts to substantially neutralize the relatively small unsaturated content of such a compound and substantially eliminates its tendency towards rapid oxidative rancidity.

The compounds in an oil or fat responsible for its characteristic taste and odor usually comprise but a very minor portion thereof, and in many instances are but a few parts per million. These compounds are usually more volatile than the glycerides, with which they are associated, and in many instances they may be removed therefrom by steam distillation at a reduced pressure to produce a substantially deodorized product. When such a deodorized oil is exposed to oxidizing conditions, particularly in the presence of heat, light or moisture, the more unsaturated components therein react to form peroxidic compounds. These peroxidic compounds in turn form carbonyl compounds, principally of an aldehydic or ketonic nature which have and impart to the oil objectionable taste and odor characteristics.

While the oleic and the linoleic acid glycerides, containing one and two double bonds respectively, or other and more unsaturated compounds associated therewith, are to some extent responsible for the so-called reversion in taste and odor, their effect is not serious. In fact, a moderate content of the more unsaturated linoleic acid glyceride in the mixture seems to have a stabilizing effect on the oil compound and tends to retard the rate of such reversion. The presence, however, of even a very minor content of the more unsaturated linolenic acid glycerides has a very active influence upon the rate of such oxidation and its tendency rapidly to develop undesirable taste and odors.

This is probably not entirely due to the presence of the normal linolenic acid glycerides, but to the association therewith of certain highly unsaturated compounds having iodine value of 300 to 400 or more, which have a strong tendency towards decomposition and oxidative rancidity with development of objectionable taste and odor, when exposed to oxidizing conditions. The amount of such compounds in the oil may be quite minute or a few parts per million.

The decomposition of such contaminates is progressive and while their products of decomposition, which account for the objectionable taste characteristics, are relatively volatile and may be removed by high vacuum steam distillation treatment to produce a relatively bland tasting oil, the highly unsaturated glyceride compounds are relatively non-volatile under such treatment, remain in the oil, and continue to react in a progressive manner to form additional decomposition products, which cause the recurrence of or reversion to the objectionable taste in the previously deodorized oil.

The only practical means of retaining permanence of the bland taste of the freshly deodorized oil is to neutralize or to remove the highly unsaturated compounds which by their progressive decomposition are the primary cause of the reversion or development of undesired taste in the deodorized oil. This may be readily done in a practical and inexpensive manner by the method of the present invention.

In carrying out the hydroxylation according to the present invention, the position of the unsaturated or double carbon bond is quite important.

Normal oleic acid glyceride has an iodine value of about 89 and has one double bond located at the 9–10 carbon position, while normal linoleic acid glyceride has an iodine value of 180 and has two such double bonds, located at the 9–10 and the 12–13 carbon positions. There are, however, several isomeric forms of both these glycerides. For instance, the double bond of the isomeric oleic acid glyceride may be in the 2, 3, 4, 6, 9 or 10 carbon position, while in the case of the isomeric linoleic acid glyceride, several forms are known, one of which has its double bonds in the 9–10 and 15–16 carbon positions.

The more remote the double bond of an unsaturated oil is from the near or carboxyl position, the more active and susceptible it is to oxidation and like reactions. A minute amount of such oxidative initiated compound will develop an unpleasant taste and odor in the oil. Even a slight trace of the more reactive or isomeric forms of these mono- and di-unsaturated glycerides in the complex oil mixture will have a major effect upon its oxidative activity and decomposition and its tendency to develop undesirable taste characteristics in the oil. If these highly reactive groups present are saturated or otherwise rendered inactive, the deodorized oil, even with a relatively high content of normal linoleic acid glyceride, will have a relatively high degree of stability against reversion.

In prior art practice, such oils generally are deodorized by subjecting them to steam distillation at relatively high temperature, for instance 350° F. to 500° F. or more, at a reduced pressure for a relatively long period of time, for instance, 4 to 10 hours or more. Such treatment serves to remove a substantial portion of the volatile contaminates, which may be then present in the oil. It does not, however, reduce its degree of unsaturation. Nor does it reduce its tendency to subsequent oxidation and the accompanying development of compounds having undesirable taste and odors when the oil is stored for appreciable periods of time. The exposure of the oil to the high deodorizing or steam distillation temperature for prolonged periods of time acts to destroy all or a major portion of the relatively heat sensitive vitamins and other compounds in the oil that are beneficial to health.

It is to be noted that by the method of the present invention, even though the oil is blown with oxygen containing gas, due to the presence of the relatively large excess of intimately contacting hydrating water, the addition groups, formed selectively at the unsaturated carbon atoms present, are of the hydroxyl type, with substantially no fixed oxygen or peroxide formation.

It has also been proposed to deodorize such oils by subjecting them to hydroxylation with dilute aqueous solution of potassium permanganate, hydrogen peroxide and the like. However, such treatment is quite cumbersome, inefficient and costly. It has not heretofore been found practical to attain any substantial degree of selectivity in the positioning of the added hydroxyl groups. Substantially all of the unsaturated carbon atoms in the compound are reacted upon, with the formation of many acidic and otherwise objectionable compounds, such as hydroxyketones at the 9–10 carbon atoms and other products of an aldehydic and ketonic nature. These compounds impart objectionable taste and odors and cause discoloration to the oil, particularly when subjected to moderately elevated temperature.

By the method of the present invention, with suitable adjustment of temperature and other reacting conditions, the hydroxyl groups are added to the oil molecule in a preferential or selective manner. When treating oils containing three or more pair of unsaturated carbon atoms, such as linolenic acid glycerides, such OH groups are added to the more remote or 15-16 and 12-13 carbon atoms without substantial addition of such groups to the near or 9-10 carbon atoms.

In the addition of hydroxyl groups to an unsaturated carbon atom, it appears that an unstable moloxide

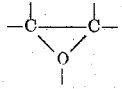

is first formed, which is then further oxidized to form a relatively stable peroxide

It is found, however, that in the presence of an excess or sufficient amount of hydrating water, the initially formed moloxide preferentially reacts therewith or hydrates to form a stable hydroxyl group

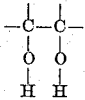

It has been found when adding hydroxyl groups to fatty acid compounds containing a plurality of unsaturated carbon atoms by blowing with air in the presence of water, the temperature at which the reaction is affected has a substantial influence upon the degree or extent of the hydroxylation. The more remote unsaturated carbon atoms react at a substantially lower temperature than those nearer the carboxyl group of the oil molecule, and that under a certain combination of reacting conditions, the hydroxyl group addition to the unsaturated atoms in the carbon chain may be readily effected in a preferential or selective manner.

For instance, when treating linolenic acid glyceride, the remote or 15-16 carbon atoms, under such a condition, will hydroxylate readily at a reaction temperature within the range of about 110° F. to 125° F. To effect such addition to the 12-13 carbon atoms, a reaction temperature of about 135° F. to 160° F. is required, while a reaction temperature of 180° F. to 250° F. or more is required to effect hydroxylation of the more refractory near or 9-10 unsaturated carbon atoms. Therefore the selective hydroxylation of the material is preferably affected within temperature ranges at which the near or 9-10 unsaturated carbon atoms are not substantially affected.

Hydroxyl groups readily add to the remote or 15-16 and the 12-13 unsaturated carbon atoms of linolenic acid glyceride, whereas the reaction to the 9-10 or near unsaturated carbon atoms results in the formation of a keto-hydroxy group. The presence of the ketone in the oil compound is objectionable, due to its relative instability and its tendency to react with oxygen to form other and objectionable compounds, such as diketones, aldehydes and the like. A relatively small content of such compounds acts to darken and have other injurious effects on the oil compound.

Therefore one of the important features of my invention is to affect the preferential or selective hydroxylation of such fatty compounds at which the more remote unsaturated carbon atoms are substantially saturated by hydroxylation, but at which the near or 9-10 carbon atoms are substantially unaffected.

The presence of the hydroxyl group in the oil molecule has a powerful stabilizing effect upon the oil, greatly reducing its normal tendency to reversion, increases its resistance to heat decomposition and raises its flash and smoking points. It also increases its emulsifiability when used in the preparation of salad dressings, mayonnaise and the like. When the oil is subsequently selectively hydrogenated or hardened, as in the manufacture of shortenings and the like, the presence of the hydroxyl groups at the remote carbon positions in the oil molecule facilitates grain and melting point control. These hydroxyl groups also improve its creaming quality and its stability against the development of undesirable taste and odors upon storage.

In the preferred method of treatment, the oil or liquid fat in the presence of an excess or a relatively large proportion of hydrating water, is intensively aerated or blown with air for a short time. The preferred ratio of the reactants will depend to a substantial extent upon the kind and quality of the oil to be treated and the degree of hydroxylation desired. In general, to obtain the maximum selectivity in hydroxylation and to minimize the formation of contaminate side reaction products, the time of treatment should be brief, for instance within the range of about 10 to 15 minutes, depending upon the intensity of treatment and the rate of aeration.

The temperature of the reaction should be substantially below that of peroxide decomposition, usually within the range of 100° F. to 225° F., and the amount of water supplied and intimately mixed with the oil should be substantially in excess of that required to hydrate the initially formed moloxide, usually amounting to 20% to 60% by weight of the oil. In general, the greater the degree of unsaturation of the oil, the lower the reaction temperature and the greater the ratio of water to oil content. In all instances, the amount of water available and in intimate contact with the oil should be substantially in excess of that required for hydration or sufficient preferentially to form hydroxyl groups and to substantially inhibit the formation of fixed oxidation compounds, such as peroxides and carbonyl groups in the oil molecule.

Any suitable means may be utilized to effect such selective hydroxylation to the oil. While the material may be treated in commercial size lots, for instance 10,000 to 20,000 lbs., by bulk or batch method, it is impractical or quite difficult thereby to attain a desired degree or perfection in the selectivity of the treatment. It is also difficult to avoid substantial oxidation of the unsaturated carbon atoms present leading to the formation of undesired carbonyl groups, such as objectionable tasting and odorous aldehyde and ketonic compounds. This is due chiefly to the difficulty in maintaining sufficient and intimate contact between all portions of the oil and hydrating water, variations of temperature in various portions of the batch due to radiation and exothermic reactions and to differences in intensity of the treatment or aeration in different portions of the batch. Also in such method of treatment, due to the large mass of the material, the time required to heat and cool, and the relatively poor oil and water contact with the air bubbling through the material, a relatively long period of time is required to complete the treatment, for instance 6 to 10 hours or more, depending upon the required degree of reaction, during which progressive side reactions occur with the formation of objectionable contaminating compounds in the oil.

Preferably, such oils and fats are deodorized and stabilized against reversion by the method of the present invention, by selective hydroxylation in a continuous manner, the oil, or liquefied fat, being passed in the presence of a determinate proportion of hydrating water in a continuously flowing stream downwardly through a hydroxylating column arranged to provide a maximum degree of intimacy of contact between a descending stream of oil and water and an ascending stream of air, while maintaining the reactants at a closely controlled determinate hydroxylating temperature. A determinate volume of air or other oxygen containing gas, preferably super-saturated with water vapor or steam and heated to the desired determinate reaction temperature, is forced upwardly through the column. The air or oxygen will mix with and intimately contact the descending stream of oil and water throughout the height of the column. The oxygen in the air will selectively react with unsaturated carbon atoms in the oil to form an unstable moloxide, which is immediately hydrated by the water present to form hydroxyl groups. The stream of oil and its accompanying water pass from the base of the column, hydroxylated to a desired extent and are then dewatered and dried and deaerated.

By the herein disclosed method of treatment, the oil and water mixture may be intimately blown or aerated with a relatively great quantity or weight of oxygen containing gas, whereby the selective hydroxylation to the flowing stream of oil may be effected within a period of a few minutes, as compared to the many hours required when treating the oil by bulk or batch method. The water content in the oil stream with its high degree of intimacy of contact is maintained constant at all times and the oil-water contact with the air is intimate and repetitive at each individual point of aeration throughout the height of the column. Under these conditions each particle of the oil is subjected to the same degree or intensity of treatment for the same determinate period of time and is therefore substantially uniform in composition.

With such apparatus and method of treatment, the degree of determinate or selective hydroxylation to which the oil is subjected may be closely controlled and varied over a relatively wide range.

For instance, the period of time the oil is subjected to the treatment may be varied by change in rate of flow of the liquid components. The intensity of aeration may be varied by change in rate of blowing, or the amount of air supplied. The water content of the flowing stream may be readily varied or increased to effect complete hydration of the initially formed moloxide and to substantially inhibit peroxidation. The temperature of the flowing stream of reactants may be varied to regulate the degree or extent of the hydroxylation reaction. All of these changes and variations in operative factors are correlative and adjustable and easily maintained at constant determinate values to obtain a desired selective hydroxylation and consequently a desired deodorizing and stabilizing effect to the oil. By such a described treatment, the material may be hydroxylated to a determinate or selected extent without the substantial formation of highly objectionable peroxidic or carbonyl groups therein.

Exemplary apparatus in which the method of my invention in its various embodiments may be practiced is shown in the accompanying drawings, it being understood that the apparatus herein shown is illustrative only of many forms and types of apparatus which conceivably may be employed while conforming to the method of my invention.

Figure 1:
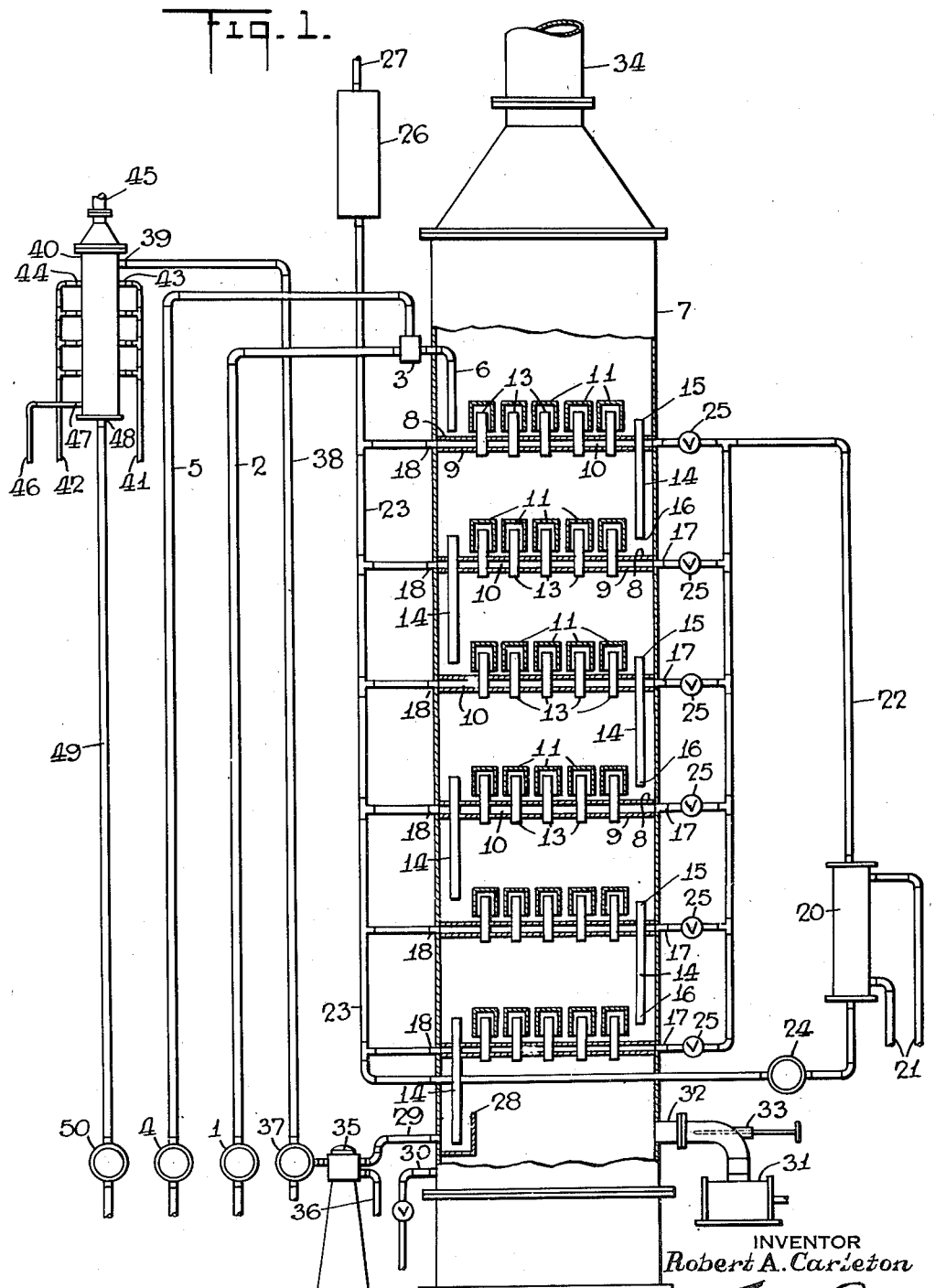
Fig. 1 is an elevation diagrammatically illustrating a preferred arrangement of apparatus for continuously deodorizing and stabilizing oils and fats containing unsaturated taste and odorous contaminates capable of hydroxylation.
Figure 2:
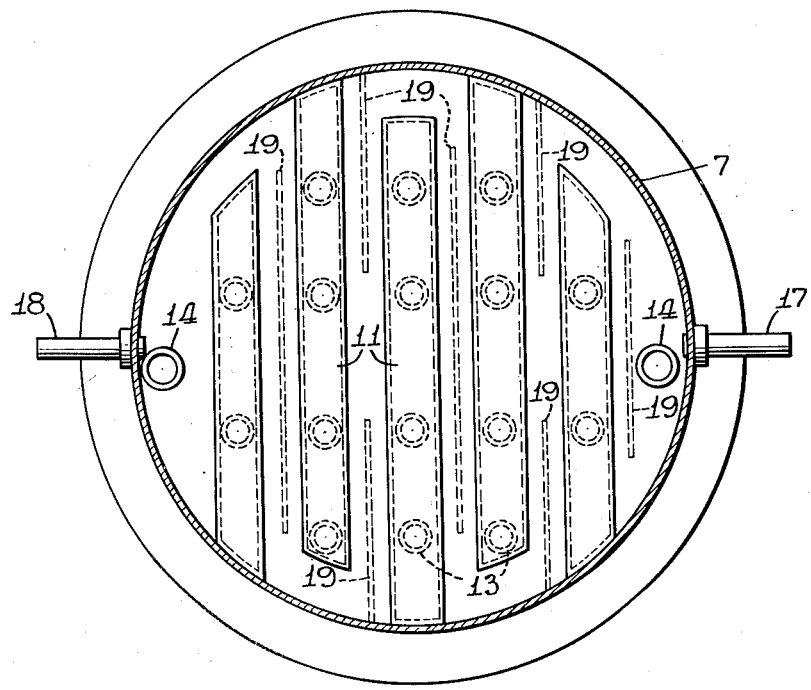
Fig. 2 is an enlarged cross sectional view of the hydroxylating reactor of Fig. 1, showing enlarged details of aerating plates.
Figure 3:
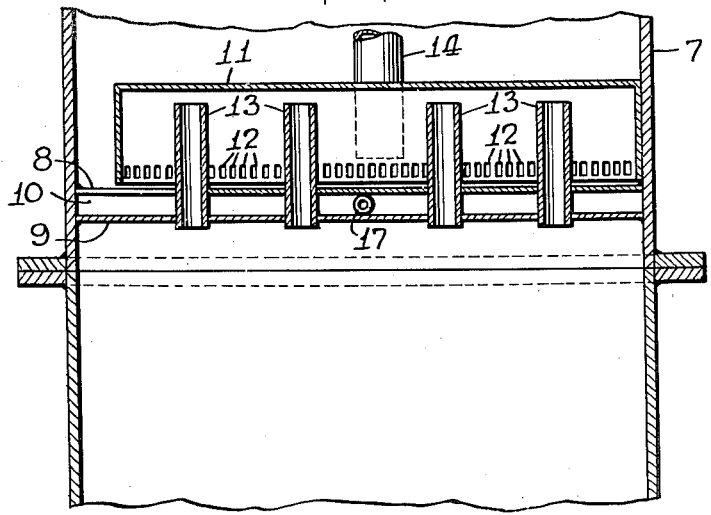
Fig. 3 is a vertical sectional view of Fig. 2, taken upon the line 3–3 of Fig. 2.

The preferred arrangement of apparatus illustrated in Fig. 1 of the drawings comprises an oil feed pump 1, which forces a continuously flowing stream of the material to be treated by pipe 2 to mixer 3. In mixer 3, the oil or fat is intimately mixed with a stream of water supplied by water feed pump 4 by way of pipe 5. The oil-water mixture then passes by inlet 6 to reactor 7. Reactor 7 comprises a columnar vessel having a plurality of jacketed aerating plates 8 associated with lower plate 9 to form jacket space 10. Aerating plates 8 are provided with bubble caps 11 having closely spaced narrow slots 12 near their lower edges. Bubble caps 11 are provided with vapor pipes 13. The upper ends of the pipes 13 terminate in the upper part of bubble caps 11 and their lower ends communicating with the next lower aerating section or plate of reactor 7.

Down pipes 14 are provided with their overflow or upper ends 15 positioned above plate 8. The overflow ends act to maintain the liquid level on plate 8. The lower ends 16 of the pipes pass to and terminate above the next lower plate 8 in the reactor 7. They also act as a seal to prevent the flow of vapor through down pipes 14.

Preferably, the height or overflow openings of down pipes 14 extending above plates 8 is adjustable, thus providing means to readily vary the depth of the liquid maintained on aerating plates 8 and thereby adjusting the volume of the material and the determinate period of time the oil is retained within column 7 for reaction.

Jacketed space 10 is provided with inlet 17 and outlet connection 18, for the supply of heat transferring medium. The baffles 19 maintain substantial uniformity of flow of the heating or cooling medium through jacket 10. Heat exchanger 20 is provided with heating and cooling means by the connections 21. The exchanger 20 is operable to heat or to cool the heat transfer medium circulated by pipe 22 to inlet 17 of jacket 10, outlet 18, pipe 23 and circulating pump 24, acting to closely maintain the flowing liquid and gaseous streams of material in reactor 7 at a substantially constant hydroxylation reaction temperature.

Control valves 25 are provided to adjust the flow of heat transfer medium to jacket space 10 of each aerating plate 8 to compensate for different heat requirement in individual reaction plates 8, due to local exothermic reaction or other such effects. Expansion tank 26 with vapor vent 27 is provided to compensate for volume changes in the heat transfer medium due to temperature changes therein and to vent any vapors or air that may collect in the heat transfer system.

Lower down pipe 14 with seal chamber 28 and discharge outlet 29 are provided for the removal of the treated oil. A drain connection 30 is provided at the lower portion of reactor 7. Air blower 31 with air inlet 32 is provided for the supply of air or other oxygen containing gas, at the bottom section of reactor 7. The top section of the reactor 7 is provided with outlet 34 for the discharge of excess air or vapors therefrom. The steam inlet 33 is provided to supply and intimately mix the steam or water vapor to supersaturate the blowing air supplied by air inlet 32.

When treating certain oils, it may be desirable to maintain the flowing streams within reactor 7 at a relatively high reaction temperature, for instance, 200° F. to 225° F. or more, which under atmospheric pressure conditions would result in excessive evaporation of the water content of the flowing stream. In such instance, desirably the vapor discharge connection 34 is provided with valve or other vapor flow restricting means, whereby the pressure within reactor 7 may be maintained at a super-atmospheric, or substantially non-vaporizing pressure, for instance, 25 lbs. gauge or more, whereby vaporization of the water content of the flowing stream is substantially avoided. Alternatively, means may be provided whereby additional hydrating water may be introduced into the flowing stream at all or determinate aerating sections of column 7 to maintain the water content at a desired concentration to affect preferential hydration of the initially formed moloxide and to substantially avoid the formation of peroxides or similar undesired compounds in the oil.

The selectively hydroxylated and substantially deodorized oil, together with its associated water, is discharged from the base of reactor 7 by outlet 29. It then passes to oil-water separating device 35. Means may be utilized to effect complete or partial separation of the free or solid water from the oil, such as a settling tank or the like. In the arrangement shown, a conventional type of centrifuge 35 is utilized to effect such separation. The water is discharged by way of connection 36 and the substantially dewatered oil passes by pump 37 and pipe 38 to inlet 39 of deaerating and drying chamber 40.

Any suitable mechanism may be utilized to deaerate and dry the oil. In the arrangement shown, a columnar vessel 40 is used, preferably having one or more heating and boiling plates, such as the plate 8 shown in reactor 7. Heat transfer medium is supplied to jacket space 10 of said plate by pipes 41 and 42 and connections 43 and 44. By this means, it is possible quickly but gradually to raise the temperature of the flowing stream of oil sufficient to break any emulsion present and vaporize and remove any dissolved or entrained water that may be in the oil.

Deaerator 40 preferably is maintained at a reduced pressure. The air and water vapor removed from the oil in said deaerator 40 passes by vapor outlet 45 to condensing and vacuum producing means (not shown).

Preferably, the oil is delivered to inlet 39 of deaerator 40 at a relatively low temperature, for instance 125° F. to 175° F. There it is quickly, but gradually, heated to a suitable oil deaerating and drying temperature, for instance 200° F. to 325° F., while passing therethrough and while under the reduced pressure. This will result in removing any entrained air or loosely bound oxygen present in the oil at a low or substantially non-oxidizing temperature and in water vapor saturated atmosphere. Undesirable oxidation effects are thus avoided that would otherwise occur should the oil be heated to a relatively high or active oxidizing temperature in the presence of substantial amounts of dissolved or entrained air and heat decomposable oxygen compounds and in the absence of hydrating water.

Preferably, steam or other suitable non-reacting gas, heated to a determinate deaerating temperature, is supplied deaerator 40 by pipe 46 and inlet 47. This steam or gas will pass upwardly through deaerator 40 by vapor pipes 13 and bubble caps 11. It will serve vigorously to agitate the downwardly flowing stream of the oil and will assist in the removal of air, water and other volatile material that may be in the oil. The oil then passes, substantially deodorized, deaerated and dried, by outlet 48, pipe 49 and pump 50 to cooling and storage facilities (not shown). Preferably, the oil delivered by pump 50 is subjected to filtration to remove any solid or colloidal impurities that may be in the oil.

Figure 4:
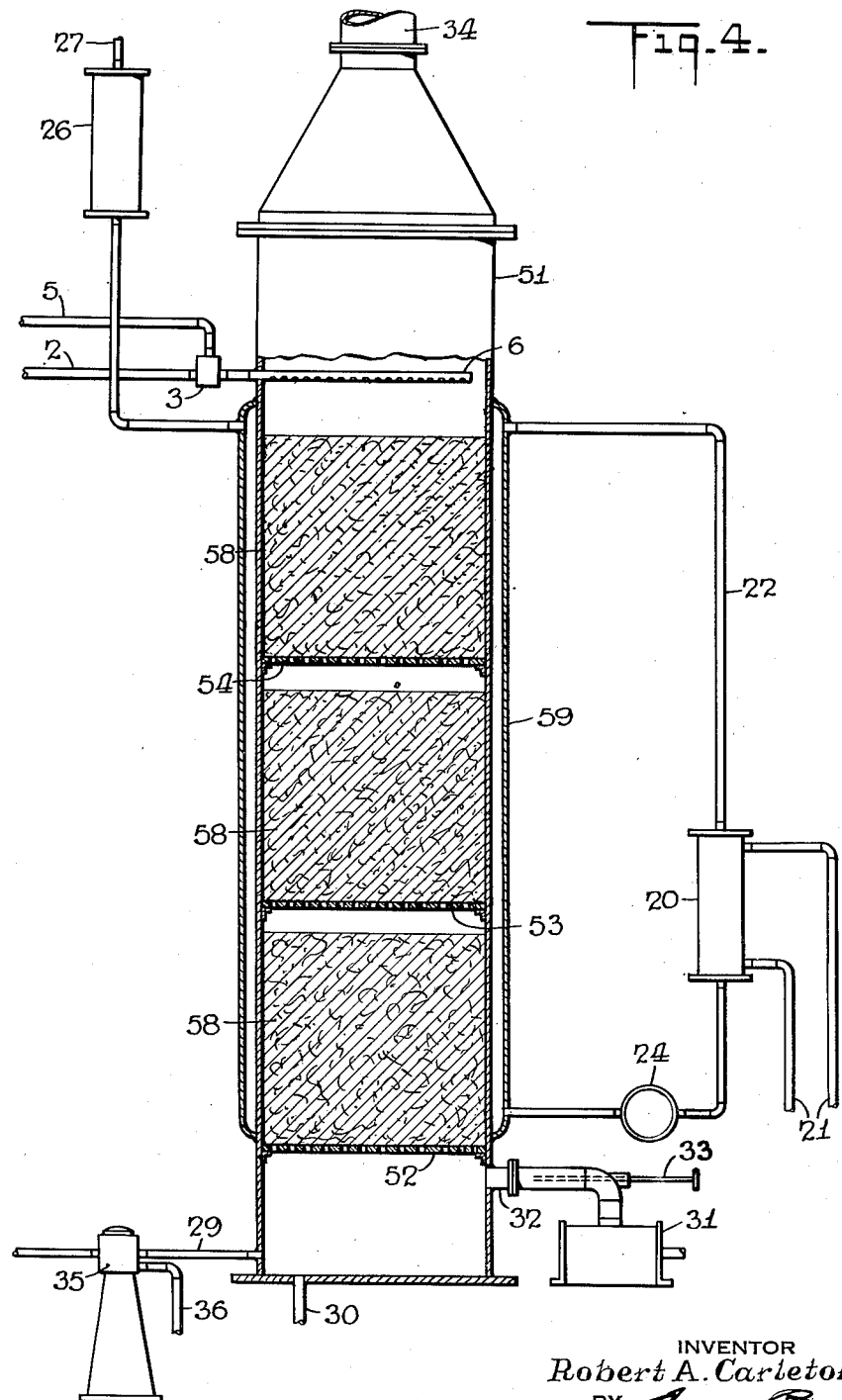
Fig. 4 is an elevation diagrammatically illustrating an alternative form of reaction column for the continuous selective hydroxylation of unsaturated fatty material.

Fig. 4 illustrates an alternative arrangement of apparatus for the continuous hydroxylation and deodorization of oil and liquid fats containing unsaturated contaminates having an objectionable taste and odor capable of hydroxylation when reacted with air or other oxygen containing gas in the presence of water. The arrangement comprises a columnar vessel 51 with inlet 6, preferably provided with a plurality of openings along its lower surface, whereby the flowing stream of oil and water is distributed in a uniform manner, such as a coarse spray, in the upper surface of the reactor, for the supply of the oil to be treated intimately mixed with a suitable amount or excess of hydrating water. It is also provided with a discharge connection 29 for the removal from the column of the liquid products of the reaction.

Air inlet 32 and steam supply connection 33 are provided, together with vapor discharge connection 34, for the removal of excess air or vapors from column 51. Perforated partitions 52, 53 and 54, extending across column 51, are provided for the support of packing material 58. The packing material 58 is composed of Raschig rings or their equivalent operable to cause intimate contact of the descending stream of intimately mixed oil and water with the ascending stream of oxygen containing gas.

Heating and cooling jacket 59 surrounding column 51 is provided. Through the jacket 59 the heat transfer medium is circulated, to heat or to cool and maintain the flowing streams of reacting materials in column 51 at a substantially constant selective hydroxylating reaction temperature. The heat transfer medium is circulated by pump 24 and heated or cooled by heat transfer mechanism 20.

Reactor 51 shown in Fig. 4 is similar in effect and is used in substantially the same manner as the reactor 7, shown in Fig. 1, except that in the reactor 51 packing rings 58 are utilized as the agitating and contact means between the liquid and gaseous reactants, instead of the plates 8 and bubble caps 11, as shown in Fig. 1. Hydroxylating column 51 is particularly effective when used with oils having a relatively low viscosity, whereas the construction as employed in column 7, shown in Fig. 1, is the more effective when used with oils having a relatively high viscosity.

Example I

Although any liquid oil or fatty material containing unsaturated components which impart an objectionable taste or odor to the oil and that are capable of hydroxylation when reacted with oxygen in the presence of water, may be treated by the method of the present invention, the operation of the method in the case of Fig. 1 will be described as applied to a commercial soya bean oil. The soya bean oil preferably will have been previously treated, as by alkali refining, to substantially remove gums, and other colloidal and suspended impurities from the oil, but it still will have its unpleasant characteristic soya bean oil taste and odor.

The oil is supplied at a desired rate, for instance 2,000 lbs. per hour, heated to a suitable reaction temperature, for instance, about 160° F., by oil feed pump 1. Fresh water, at a temperature of 160° F. is supplied by water feed pump 4 at a rate of about 800 lbs. per hour. The oil and water streams being intimately mixed while passing through mixing device 3, the inlet 6 to upper aerating plate 8 of reactor 7 and over plate 8 in a rapidly flowing sinuous manner between bubble caps 11.

Reactor 7 preferably is constructed of metal not substantially affected by the corrosive action of the materials being treated, for instance nickel or chrome alloy steel, and is of suitable dimensions to obtain the desired period of reaction, a convenient size in the present instance, being 2.5 feet in diameter and 18 feet high, with 12 aerating or reaction plates 8.

The liquid fills plate 8 of reactor 7 to a depth of about three inches, overflowing and passing by way of downpipe 14 to next lower aerating plate 8, over which it passes in a like manner. It finally passes by lower down pipe 29 and discharge connection 30 from the lower portion of reactor 7, requiring a period of about 20 minutes to pass from inlet 6 to outlet 30 of the reactor.

Air, at a pressure of about 2 lbs. gauge and heated to a temperature of about 160° F. and at a rate of about 750 cubic feet per minute, is supplied by way of air inlet 32. It then passes, together with sufficient steam supplied by way of inlet 33 to saturate the air, upwardly through the reactor by vapor pipes 13 and closely spaced slots 12 in the sides of bubble caps 11. It will thus intimately mix with and agitate the downwardly flowing stream of oil and water at each plate or stage. The excess air, together with any vapors present, will pass from the top of reactor 7 by vapor outlet 34.

A suitable heat transfer medium, for instance, mineral oil, is forced by pump 24 through heater 20 where it is heated to a temperature of about 180° F. It is then circulated through jacket 10 of reacting plates 8 and will supply heat lost by radiation or other means and will maintain the flowing streams of reacting materials within reactor 7 at the desired constant hydroxylation reaction temperature.

Reactor 7 preferably is insulated to reduce loss of heat therein by radiation. The amount of heat to be supplied by heater 20 and the circulating heating medium will depend to a major extent upon the temperature and activity of the surrounding air, the exothermic reactivity of the oil, and many other factors which will effect to a substantial degree the required temperature differential between the heat transfer medium and the material flowing through the reactor.

In certain instances, the oil may exhibit a variance in its heat requirements at different stages of its reaction, having more exothermic reaction, for instance, while passing through the upper portion of the reactor than at the lower portion. This variation will depend upon the intensity of the aeration, and upon the kind and condition of the oil. In this event, the valves 25 are adjusted to supply a greater or less amount of the heat transferring medium to individual plate jackets 10 to maintain the material being treated thereon at substantially the desired reaction temperature.

The amount of air and water supplied are adjustable over a wide range and may be varied to effect the desired degree and rate of selective hydroxylation to the oil during the period of time it is passing through the reactor. The oil after a predetermined period of reaction is removed from the reaction zone.

The oil discharged at outlet 30 of the reactor passes to centrifuge 35 where substantially all the free or solid water is removed from the oil. The water removed is discharged by outlet 36. The relatively dry oil, at a temperature of about 150° F. will pass by oil pump 37 and pipe 38 to inlet 39 of deaerator 40.

Deaerator 40 is maintained at a reduced pressure, for instance, 10 mm. of mercury. The deaerator 40 is provided with a plurality of heating and boiling plates, four being shown on the drawing, preferably of a type similar to the jacketed aerating plates 8 utilized in reactor 7.

Heat transfer medium, for instance, circulating oil at a temperature of about 375° F., passes by pipes 41 and 42 to inlet 43 and outlet 44 of the heating plates. Here it will heat the stream of oil passing downwardly through deaerator 40 to a desired oil drying, deaerating and peroxide decomposing temperature, for instance 350° F.

Steam at a rate of about 75 lbs. per hour, superheated to about 325° F., is supplied to the bottom of deaerator 40 by pipe 46 and inlet 47. It will pass upwardly through the deaerator by the vapor ducts 13 and bubble cap slots 12, acting to hydrate any unstable oxygen compounds that may be present, agitating the oil and facilitating the removal of air and other volatile vapors that may be therein. The steam and vapors present pass by vapor outlet 45 to suitable condensing and vacuum producing means, not shown.

Deaerator 40 preferably is so proportioned that the flowing stream of oil passes through it in a period of about ten minutes or less, and is then discharged by way of connection 48 and pump 50 to suitable cooling and storage facilities, not shown. Preferably, to effect economy of heat, the hot treated oil is cooled by heat exchange with a cooler portion of the same flowing stream.

The soya bean oil treated in the above example had an iodine value of 134, a hydroxyl value of 2.2, a viscosity of 0.6 poise and color of 8 on the Gardner-Holdt color scale. The treated oil had an iodine value of 118, a hydroxyl value of 38, a viscosity of 0.7 poise and a color of 6. It also had a pleasant bland taste and was substantially odorless. On accelerated oxidation by Swift's stability method, it required a period of 65 hours to develop a rancid flavor, as compared to 8.1 hours for a sample of the same oil deodorized by usual batch steam-vacuum method at 400° F. and 35 mm. Hg pressure for a period of 5.5 hours.

Example II

Linseed oil having an iodine value of 178, a hydroxyl value of 2.3, a viscosity of 0.5 poise, and a color of 6, was treated by the same general procedure as in Example I, except that the reaction temperature was 132° F. and time of reaction 20 minutes. The treated oil had an iodine value of 135, a hydroxyl value of 76, a viscosity of 0.8 poise and a color of 5. It also had a pleasant bland taste and was substantially odorless. When subjected to accelerated oxidation it required a period of 58 hours to develop a rancid flavor, as compared to 3.6 hours for a sample of the same oil deodorized by usual steam-vacuum method.

*Example III*

Menhaden fish oil, having an iodine value of 162, a hydroxyl value of 3.3, a viscosity of 0.6 poise and a color of 8, was deodorized in a manner similar to Example I, except at a reaction temperature of 128° F. for a period of 15 minutes. The treated oil had an iodine value of 125, a hydroxyl value of 61, a viscosity of 0.8 poise and color 6, had a pleasant bland taste and was substantially odorless. When subjected to accelerated oxidation, it required a period of 52 hours to develop a rancid flavor, as compared to 2.5 hours for a sample of the same oil deodorized by usual steam-vacuum method.

*Example IV*

Marine animal oil, consisting principally of oleic acid glyceride, with a minor proportion of glycerides having from 3 to 6 double carbon bonds, with iodine value of 115, and having a disagreeable fishy taste and odor, was treated in a manner similar to Example I, except at a reaction temperature of 150° F. and a reaction period of 25 minutes. The treated product had an iodine value of 102, had a pleasant bland taste and was substantially odorless. When subjected to accelerated oxidation, it required a period of 40 hours to develop a rancid flavor as compared to 2.5 hours for a sample of the same oil deodorized by usual steam-vacuum method.

*Example V*

Prime leaf lard having an iodine value of 67 was treated in a manner similar to Example I, except at a temperature of 180° F. and with 0.015% by weight of benzoyl peroxide as catalyst, and a reaction period of 15 minutes. The treated product had an iodine value of 64.5, had a pleasant bland taste and was substantially odorless. When subjected to accelerated oxidation, it required a period of 75 hours to develop a rancid flavor, as compared to 6.5 hours for the untreated lard.

The general method of procedure outlined above for the deodorization of specific oils by selective hydroxylation applies to the treatment of other oils commonly used for edible, industrial, pharmaceutical and like purposes, the principal difference in treatment being in the degree of heat, the amount of water required and the time of the treatment. Certain mild oils, such as peanut oil and highly saturated fatty compounds, for instance, require less intensive treatment than stronger oils such as the more unsaturated fish or linseed type oils.

Hydroxylating catalysts, under certain conditions, may be advantageously utilized and will accelerate the hydroxylation reaction to a substantial extent. The hydroxylation will then tend to be more complete and effect the near as well as the more remote unsaturated carbon atoms in the oil molecule, leading to the formation of undesired carbonyl compounds therein.

If maximum selectivity of the reaction is not required, any suitable and available hydroxylating catalyst may be utilized, such as compounds of copper, cobalt, manganese and the like, alkali earth metal compounds, or one of the many organic compounds available, such as benzoyl peroxide, acetyl peroxide and the like. The amount used is generally quite small, for instance, 0.01 to 0.04% the weight of the oil.

While the operation of the invention has been described particularly in relation to the deodorization or treatment by selective hydroxylation of oils and fats for edible uses, it is obvious that its use may be extended to effect partial or complete hydroxylation of other material containing unsaturated carbon atoms capable of hydroxylation. This is particularly so when it may be accomplished by blowing with oxygen containing gas in the presence of an excess of hydrating water, whereby such material may be rendered substantially water soluble and acquire other advantageous properties adapting it to wide and important uses in chemical and industrial arts. Also, while the use of specific reaction temperatures and proportions of the reactants and time of treatment has been disclosed, it is obvious that other temperatures, proportions of the reactants and time of treatment may be utilized to suit the particular requirement of the hydroxylating reaction and as may necessarily be modified by the characteristics of the material being treated.

The foregoing disclosure of my invention has been made full and detailed in order that the invention may be fully understood and that full benefits may be derived from it. It will be obvious, however, that many other embodiments of the invention may be made by those skilled in the art and it will be therefore understood that the particular devices and arrangement of apparatus and methods of operation shown and described herein are of an illustrative character and are not restrictive and that various changes in form, construction or arrangement of parts and methods of use may be made within the spirit and scope of the invention as set forth in the following claims.

What is claimed is:

1. The method of continuously deodorizing and stabilizing soya bean oil having an objectionable taste and odor, and an iodine value of 120-140, which comprises passing a continuously flowing stream of the oil intimately mixed with about 10% to 40% by weight of water and in the presence of a hydroxylating catalyst, at a determinate selective hydroxylating reaction temperature within the range of about 100° F. to 225° F. against a counter-current stream of air to reduce said iodine value by hydroxylation to about 100-120 and to effect substantial elimination of said objectionable taste and odor from the oil, de-aerating and drying said oil by heating quickly at a reduced pressure and in the presence of water vapor to a temperature between about 250° F. to 400° F., then quickly cooling said oil, said oil being characterized by the substantial absence of peroxide and carbonyl groups and a relatively high resistance to development of oxidative rancidity.

2. A process of treating alkali refined soya bean oil to remove characteristic soya bean taste and odor which comprises flowing the oil downwardly mixed with water in the proportion of 20 parts by weight of the former to 8 parts by weight of the latter while aerating the same at a temperature of 160° F. with steam saturated air, said air flowing upwardly in counter-current flow to the flow of soya bean oil, about 750 cubic feet of air per minute being used for a rate of flow of 2000 pounds of oil per hour and removing the water and air from the oil.

3. A process of treating alkali refined soya bean oil to remove characteristic soya bean taste and odor which comprises flowing the oil downwardly mixed with water in the proportion of 20 parts by weight of the former to 8 parts by weight of the latter while aerating the same at a temperature of 160° F. with steam saturated air, said air flowing upwardly in counter-current flow to the flow of soya bean oil, about 750 cubic feet of air per minute being used for a rate of flow of 2000 pounds of oil per hour and removing the water and air from the oil, and steaming the oil by superheated steam of about 325° F. using about 75 parts of steam for each 2000 parts of oil to hydrate any unstable oxygen compounds present.

4. A process of treating alkali refined soya bean oil to remove characteristic soya bean taste and odor which comprises flowing the oil downwardly mixed with water in the proportion of 20 parts by weight of the former to 8 parts by weight of the latter while aerating the same at a temperature of 160° F. with steam saturated air, said air flowing upwardly in counter-current flow to the flow of soya bean oil, about 750 cubic feet of air per minute being used for a rate of flow of 2000 pounds of oil per hour and removing the water and air from the oil and employing benzoyl peroxide as a hydroxylating catalyst in the amount of about 0.01 to 0.04% of the oil.

ROBERT A. CARLETON.

REFERENCES CITED

The following references are of record in the file of this patent:

UNITED STATES PATENTS

| Number | Name | Date |
|---|---|---|
| 222,983 | Cattanach | Dec. 30, 1879 |
| 1,337,339 | Booge | Apr. 20, 1920 |
| 2,044,007 | Long | June 16, 1937 |
| 2,361,793 | Porter et al. | Oct. 31, 1944 |